United States Patent Office 3,544,813
Patented Dec. 1, 1970

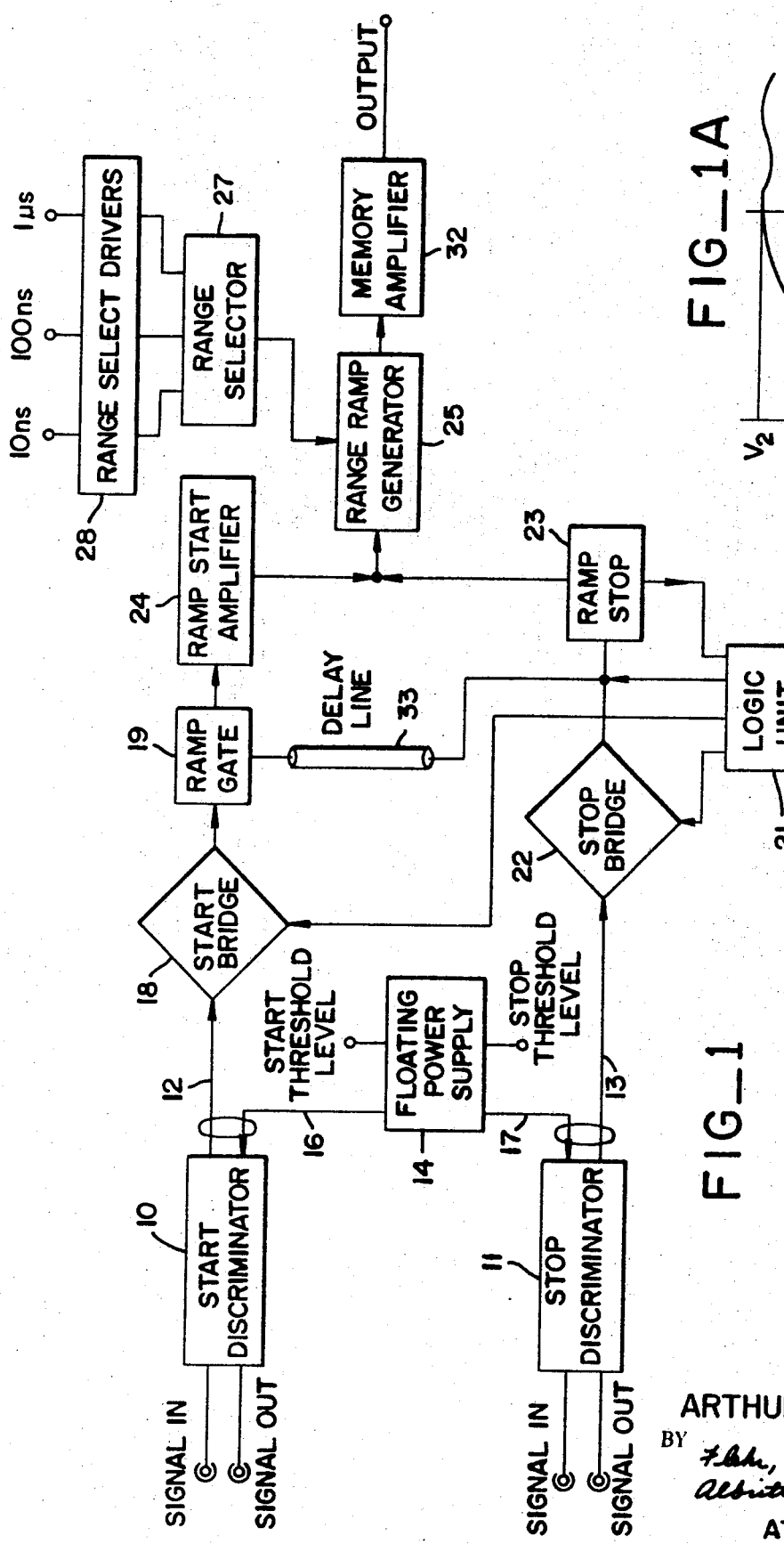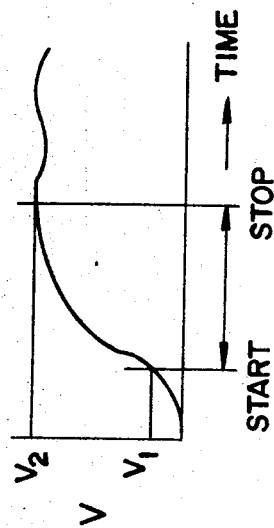

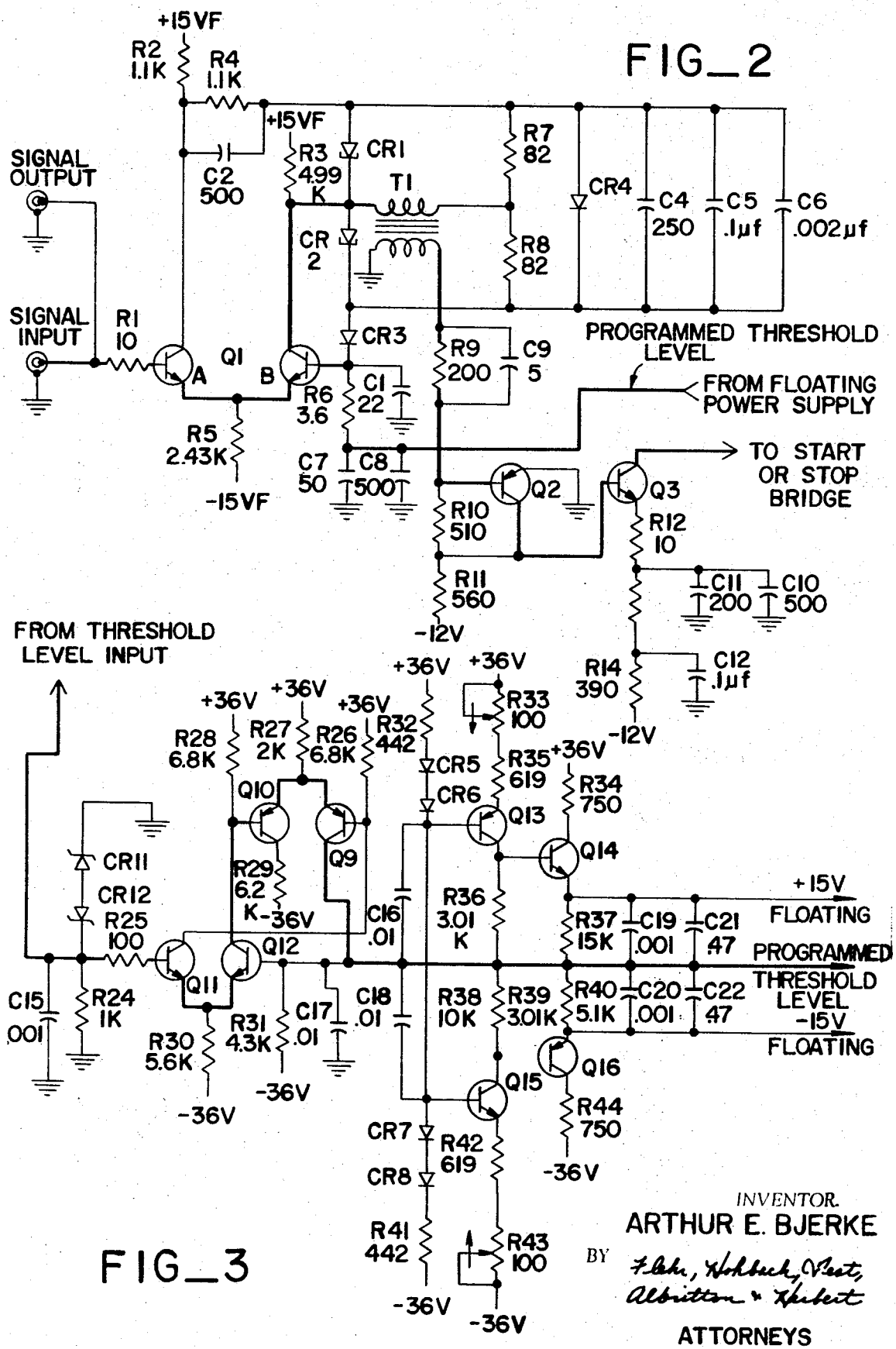

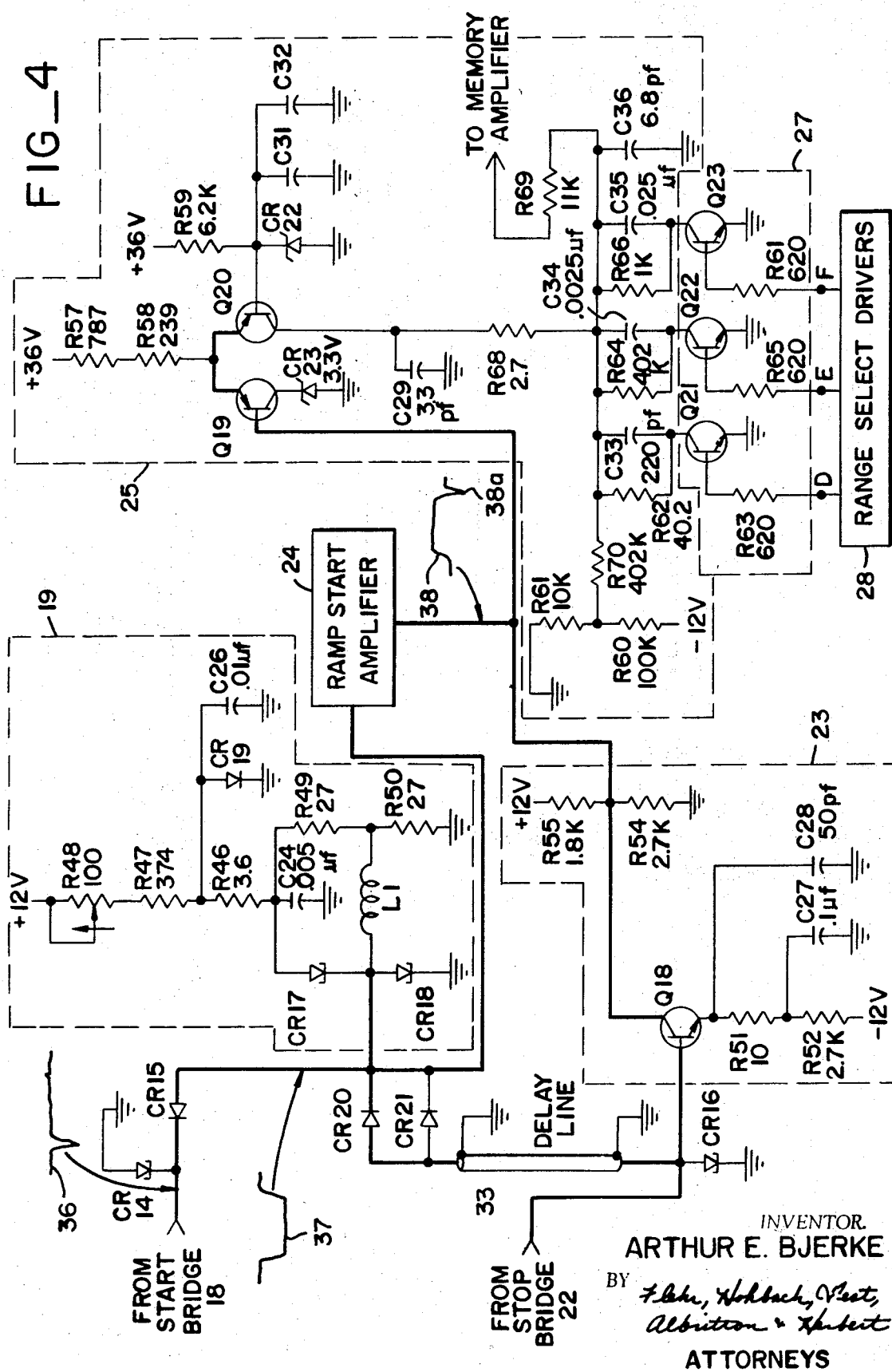

3,544,813
TIME TO HEIGHT CONVERTER
Arthur E. Bjerke, Walnut Creek, Calif., assignor to E-H Research Laboratories, Inc., Oakland, Calif., a corporation of California
Filed Dec. 14, 1967, Ser. No. 690,448
Int. Cl. H03k 5/18
U.S. Cl. 307—232
6 Claims

ABSTRACT OF THE DISCLOSURE

A time to height converter which provides start and stop pulses in response to a test signal reaching two predetermined threshold levels of a test waveform. The time interval between the start and stop signal is converted to a height proportional to the time interval. A discriminator pair of transistors are coupled in close proximity to a device under test to sense the test signal waveform. Each discriminator has a floating power supply for its positive and negative voltage sources. The floating power supply maintains a constant voltage difference between the programmed threshold level input and the voltage sources. A range ramp generator is turned on by a start pulse to couple a constant current source to an integrating capacitor and decouples the current source from the capacitor by a stop signal which overrides the start signal. The integrating capacitor is charged to a magnitude proportional to the time interval between the start and the stop pulses.

BACKGROUND OF THE INVENTION

The present invention is, in general, directed to a time to height converter and more specifically to apparatus for sensing selected levels at two different points on a test waveform and converting the time difference between these points to a proportional voltage.

In the testing of solid-state devices, increasing device sophistication and high-speed performance have complicated testing procedures. First, the high-speed performance of such devices requires compatible test instrumentation. Secondly, with increasing sophistication, each solid-state device may require several tests and a single test with a complex device may require a relatively long test time.

Thus, it is apparent that present methods of testing which are repetitive in nature where, several test waveforms must be processed for a single test are unduly time consuming. In addition, a repetitive type test may not provide an accurate indication of the response of the circuit under actual operating conditions. Such an indication is better provided by a single-shot time interval measurement. However, present testing devices do not yet have this capability at high frequencies.

SUMMARY OF THE INVENTION AND OBJECTS

It is therefore a general object of this invention to provide an improved time to height converter.

It is another object of the invention to provide a time to height measurement system having single-shot capability.

It is another object of the present invention to provide a system as above having improved high frequency performance.

In accordance with the above objects there is provided a time to height converter for providing first and second timing pulses in response to a test signal reaching two predetermined threshold levels. The converter is responsive to the time interval between the timing pulses for generating an output pulse having a height proportional to the time interval. The invention comprises first and second discriminator means coupled to a test signal source. Each of these discriminators includes a semiconductor switching means for comparing the test signal level with a pre-determined one of the threshold levels for providing one of the timing pulses. The switching means is coupled between voltage sources of opposite polarity. These sources include means responsive to a change in threshold level for varying the magnitude of the sources to maintain a constant voltage difference between the threshold level and the voltage source magnitudes.

Another aspect of the invention includes switching means coupled to the discriminator means for respectively coupling and decoupling a current source to energy storage means such as a capacitor. A capacitor provides a voltage level proportional to the time interval between the timing pulses. Gate means coupling the discriminator and switching means are responsive to the first timing pulse to provide a step function for closing the switching means and charging the capacitor. Stopping means are coupled between the discriminator and switching means and are responsive to the second timing pulse in time to provide a stop pulse of opposite polarity to the step function pulse to open the switch. The stopping means is also coupled to the gate means to cause a cessation of the step function pulse within the effective time duration of the stop pulse.

BRIEF DESCRIPTION OF THE DRAWINGS

FIG. 1 is a block diagram of a time to height converter embodying the present invention;

FIG. 1A shows a typical input test signal which is useful in understanding the invention;

FIG. 2 is a circuit diagram of the discriminator block of FIG. 1;

FIG. 3 is a circuit diagram of a portion of the power supply block of FIG. 1; and FIG. 4 is a circuit diagram showing several other functional blocks of FIG. 1.

DESCRIPTION OF THE PREFERRED EMBODIMENT

Referring first to FIGS. 1 and 1A a typical test signal from a device under test is coupled through the Signal In and Signal Out terminals of a start discriminator 10 and a stop discriminator 11. The signal itself is shown in FIG. 1A. To make a time measurement between points on this voltage transient signal it is in general necessary to set the start and stop discriminators to threshold levels which correspond to the appropriate points on the wave form between which a timing measurement is desired. Thus, at the voltage level $V_1$ start discriminator 10 would produce an output timing pulse and at the voltage level $V_2$ the stop discriminator 11 would produce a second timing pulse.

Each discriminator 10 and 11 provides an output pulse on lines 12 and 13 when the applied signal crosses the threshold level in either direction. A floating power supply 14 is coupled to both start and stop discriminators 10 and 11 on lines 16 and 17 respectively. This provides operating power to the discriminators and biases the respective discriminators with an externally applied start threshold level and stop threshold level. These levels would normally be programmed by computer.

Each discriminator of the system of the present invention is located in close proximity to the device under test to minimize cabling capacitance. The output of each discriminator through the lines 12 and 13 is then cabled over a distance of perhaps several feet to the remainder of the system. Thus, the location of the discriminators at the device under test minimizes signal degradation.

Coupled to the output of start discriminator 10 on line 12 is a start bridge 18 which connects the output of the start discriminator to the input of a ramp gate 19 when the bridge is gated on a logic unit 21. The logic unit is not shown in detail but provides for the performance of the different functions of the system in logical order. Similarly, a stop bridge 22 is coupled to the output line 13 of stop discriminator 11 to couple discriminator 11 to a ramp stop means 23 during the measurement interval.

Ramp gate 19 drives a ramp start amplifier 24 which has an output coupled to a range ramp generator 25 in conjunction with the output from ramp stop means 23. In response to a timing pulse from the start bridge 18 and start discriminator 10, ramp gate 19 causes the ramp start amplifier to generate a step function which turns on the range ramp generator 25. This generator is in essence a constant current source with a current commutating pair of transistors. In its quiescent condition, the constant current from the range ramp generator is diverted to ground and produces no output. When turned on by the ramp start amplifier 24 the range generator switches its constant current into a charging capacitor and generates a range ramp having a constant slope of voltage divided by time. The amount of the slope is selected by range selector 27 and range select drivers 28, which provide for range ramps of one nanosecond, one microsecond, 10 nanoseconds, and 100 nanoseconds. The output of the range ramp generator 25 is coupled to a memory amplifier 32 which is an operational amplifier with a voltage gain of 1. The input to this memory amplifier is the peak voltage level established by the capacitor storage of the range ramp generator. The memory amplifier stores this voltage to provide the final output for a predetermined duration of time such as 1 millisecond. This output is a voltage proportional to the original time interval between the start and stop timing pulses.

Logic unit 21 is also coupled to the ramp gate 19 through a delay line 33 and to the input and output of ramp stop means 23.

A detailed circuit schematic of either the start discriminator 10 (or the stop discriminator 11 which is identical) is illustrated in FIG. 2. In general, the discriminator includes a programmable voltage comparator circuit and a pulse shaping amplifier. Transistors Q1A and Q1B function as a voltage amplitude discriminator pair. The base voltage of Q1B is established at the programmed threshold level from floating power supply 14. The input signal is coupled through a resistor R1 to the base of Q1A. Transistors Q1A and Q1B divide their common emitter current in accordance with their relative base voltages.

Tunnel diodes CR1 and CR2 form a bistable multivibrator which is driven by the output of the amplitude discriminator pair Q1A and Q1B. The collector current for Q1A robs the total current from the tunnel diode multivibrator. The collector current for Q1B adds current to CR1 and robs current from CR2.

The voltage drop across a forward biased diode CR4 sets the voltage level across the two series connected tunnel diodes CR1 and CR2 at a predetermined value. This voltage drop requires that one of the tunnel diodes be in a high voltage state and the other in a low voltage state.

In operation, when the applied signal at the base of Q1A, which is from the test signal waveform, is more negative than the programmed threshold level at the base of Q1B, conduction of Q1B holds CR2 in the low voltage state and forces CR1 into the high voltage state. When the applied signal at the base of Q1A becomes more positive than the programmed threshold level at the base of Q1B, the positive going waveform at the collector of Q1B forces CR2 into the high voltage state and CR1 into the low voltage state. Switching of the tunnel diode multivibrator CR1, CR2 occurs when the applied voltage signal crosses the programmed threshold level.

The switching transient of the tunnel diode multivibrator is coupled through a pulse transformer T1 to the base of Q2. In addition to coupling the output of the tunnel diode multivibrator, transformer T1 also serves as a DC isolation between the discriminator circuitry and the output stages. Transistors Q2 and Q3 serve as output amplifiers which are always turned on. The pulse output from transformer T1 increases or decreases the conduction in Q2 and Q3 to produce the output pulses which are coupled into start or stop bridge 18 or 22 depending on which bridge this particular discriminator is associated with.

Transistors Q2 and Q3 are supplied with appropriate biasing voltages through resistors R10 through R14; in addition capacitors C10 through C12 perform a bypassing function.

A resistor R6 is coupled between the programmed threshold level input from floating power supply 14 (FIG. 1) and the base input of discriminator transistor Q1B. The programmed threshold level, of course, determines the switching point of the discriminator transistor Q1A, B. In addition, this level is determined by the positive voltage supply labeled +15VF through resistor R2 to the collector of Q1A and through resistor R3 to the collector of Q1B; a negative 15VF is coupled to the tied emitters of Q1A, B through resistor R5. As will be explained in greater detail below, VF is an abbreviation for "floating voltage." The absolute magnitude of this voltage in conjunction with the magnitude of resistor R6 is adjusted to compensate for any hysteresis effect in the switching characteristic of the discriminator.

The values of the circuit components are shown on the drawing with resistance in ohms and capacitance in picofarads except where indicated.

Referring now to floating power supply of FIG. 3, there is actually a separate power supply for each discriminator. The output of such supply is the programmed threshold level which is applied to the discriminator along with the positive floating supply voltage, +15 VF, and the negative floating supply voltage, —15 VF. For the present circuit 15 volts is a nominal value. However, the actual value is dependent on the specific programmed threshold level input on the input labeled "threshold level input." This input is a DC reference level normally varied between +5 and —5 volts.

As mentioned above, the threshold level establishes the point on the input signal at which time measurement will start, or in the case of the stop voltage power supply, where the measurement will stop. Transistors Q9 through Q12 with their associated components comprise a regulated power supply which holds the output voltage on the programmed threshold level output line at a voltage equal to the input reference threshold level voltage. Transistors Q11 and Q12 make up an emitter coupled DC comparator pair. When their base voltages are equal they divide the current from their common emitter resistor R30. Since their collector load resistors R26 and R28 are equal their collector voltages will be equal.

Similarly, transistors Q9 and Q10 make up an emitter coupled DC comparator pair. When the collector voltages of Q9 and Q10 are equal the base voltages of Q11 and Q12 are equal and they divide current through their common emitter resistor R27. The collector load for Q9 is R31 which is at the base of Q12. Q9 is the equivalent of the series element in a voltage regulated power supply where the voltage at the base of Q12 is the output of the regulated supply and the voltage at the base of Q11 is the reference to which the supply regulates.

If the threshold level input voltage is increased in the positive direction, Q11 increases conduction. Since Q11 and Q12 share an essentially constant current source, Q12 decreases in conduction. The increase in conduction of Q11 provides additional base current to Q9; the decrease in conduction of Q12 decreases base current to Q10. The resultant increase in collector current in Q9 will pull the base of Q12 up to equal the base of Q11. If the threshold level input voltage has changed in the negative direction, the same action occurs, but the changes are of opposite polarity. Within the voltage gain limits of the circuit, the voltage at the base of Q12 (which is the output voltage coupled to a discriminator) is held equal to the threshold level input voltage at the base of Q11.

Transistors Q13 and Q14 and their associated components constitute a regulated voltage supply which holds the output at the +15 volt floating terminal at predetermined voltage such as 15 volts positive with respect to the programmed threshold level. R41, CR7, CR8, R38, CR5, CR6, and R32 makeup a voltage divider between the negative 36 volt supply and the positive 36 volt supply. The divider sets the voltage at the base of Q13 with respect to the positive 36 volt supply voltage. This base voltage level, together with the values of R33 and R35 causes Q13 to be a constant current source to R36. The value of R36 and the constant current delivered to it by Q13 sets the base voltage of Q14 at approximately 15 volts positive with respect to the programmed threshold level. Q14 functions as an emitter follower and holds the +15 volt floating output at approximately the value. The adjustment shown at R33 is provided to compensate for component tolerances and junction drops.

Transistors Q15 and Q16 and their associated components constituted a regulated voltage supply which holds the output voltage at the negative floating output approximately −15 volts with respect to the programmed threshold level output. Q15 and Q16 function in the same manner as Q13 and Q14 except for inversion of polarities. The component values of the circuit are listed on the drawing with the resistors being in ohms and the capacitors in microfarads.

Thus, in accordance with the invention, a change in the threshold level input will cause the floating positive and negative power supplies to maintain a constant voltage difference between the programmed threshold level and the magnitudes of the floating voltage sources. Even with a change in the programmed level the discriminator circuit operates in a manner as if no change in level had occured. Thus, by the provision of floating power supply sources the discriminator circuit is made insensitive to changes made in the programmed threshold level.

Start and stop pulses from bridges 18 and 22 (FIG. 1) are coupled respectively as shown in FIG. 4 to the ramp gate 19 and ramp stop amplifier 23. Ramp gate 19 recognizes the first start pulse, waveform 36, which occurs after the logic unit 21 allows it to do so and initiates a time measurement ramp. Coupled to the input line to ramp gate 19 is a tunnel diode CR14 which is grounded. The negative going waveform 36 snaps CR14 to its high voltage state unclamping the input line to allow the start pulse 36 waveform to be coupled through diode CR15 to the input of ramp gate 19 at the junction of two series connected tunnel diodes CR17 and CR18.

In general, ramp gate 19 is a tunnel diode multivibrator made up of CR17 and CR18. The voltage drop across these two series tunnel diodes is held to a constant value by forward biased junction drop of diode CR19 which is coupled to tunnel diode CR17 through resistor R46. This insures that one of the tunnel diodes will be in high voltage state and one in the low voltage state. In the quiescent condition, CR18 is in the high voltage state and CR17 is in the low voltage state. Also, under this condition the major current flow path through the tunnel diode multivibrator is from ground through R50, L1, and CR17. When CR14 is changed to its high voltage state by the start pulse 36, this pulse is coupled through CR15 to the junction of diodes CR17 and CR18. This drives CR18 to its low voltage state and therefore CR17 to its high voltage state. In this condition the start signal switching the tunnel diode multivibrator, CR17, 18, the major current flow path is from ground through CR18, L1, and R49. As shown by the waveform 37, the output of the tunnel diode multivibrator, is a negative going pulse in the form of a step function initiated by a pulse from the start bridge. It is terminated by a pulse from the stop bridge 22 through delay line 33 and diodes CR20 and CR21. Delay line 33 provides a relay such that the trailing edge of the ramp gate output pulse 37 occurs approximately 1 nanosecond after the stop pulse has been recognized by the range ramp generator 25.

Pulse 37, after being amplified by ramp start amplifier 24 is coupled to the base input of transistor Q19 of the range ramp generator 25. As discussed above this turns on the range ramp generator to couple a constant current source to storage capacitors to provide an output voltage having an amplitude proportional to the time interval between the start and stop pulses.

More specifically, the range ramp generator 25 includes a current commutating pair of transistors Q19 and Q20. These transistors switch a constant current from the positive 36 volt source which is coupled to the tied common emitters of the transistors through R57 and R58 selectively to a selected one of capacitors C33 through C36.

The base voltage of Q20 is held constant by a Zener diode CR22. The base voltage of Q19 is of course determined by the input magnitude of the voltage supplied from ramp start amplifier 24 and the ramp stop amplifier 23 which will be discussed in detail below.

In the quiescent condition of ramp generator 25, the base voltage of Q19 is more negative than the base voltage of Q20 and Q19 conducts all the current from the 36 volt current supply through R57 and R58 to ground through the Zener diode CR23.

The timing range of the range ramp generator is determined by a selection of the capacitors C33 through C36 which is made by the range selector 27. The range selector consists of three transistors Q21, 22, and 23 which are selectively made conductive by the range select drivers 28; transistor Q21 supplies the 10 nanosecond range, transistor Q22 the 100 nanosecond range, transistor Q23 the 1 microsecond range. If none of these three circuits, Q21–Q23 are energized by the external range select drivers, measurement will be made in the 1 nanosecond range.

Ramp stop amplifier 23 terminates the range ramp generator when a stop pulse is recognized. The ramp stop amplifier includes transistor Q18 which has its base input coupled to the stop bridge 22. This input is a positive going pulse. The quiescent DC collector current of Q18 is set by emitter resistors R51 and R52 coupled to a negative 12 volt power supply. When a positive going stop pulse from the stop bridge snaps tunnel diode CR16 into its high voltage state, the resulting increase in collector current in Q18 turns on Q19 in the range ramp generator circuit. This stops the range ramp at a voltage proportional to the time interval between the start and stop pulses.

The operation of the time to height portion of the circuit which includes the ramp gate 19, range start amplifier 24, ramp stop amplifier 18, range ramp generator 25 and range selector 27 is initiated upon production of a start pulse from start bridge 18. This produces the step function type pulse 37 which after being amplified becomes the positive going pulse 38 to turn on Q19 in the range ramp generator. However, a negative going output pulse from ramp stop amplifier 18 responds to a stop pulse from stop bridge 22 to turn off Q19, and is shown by the negative going portion 38a of the waveform to the base of Q19. Thus, the switching speed of the entire circuit is enhanced since the turning off of the current source by switch Q19 is independent of the turn on circuit which includes the ramp gate 19 and ramp start amplifier 24. Ramp gate 19 is switched to its quiescent state by the stop pulse through delay line 33 approximately 1 nanosecond after the stop pulse has been recognized by Q19 and during the effective duration of the negative going pulse 38a to Q19.

The appropriate component values are also shown on the schematic of FIG. 4 with the resistors in ohms and the capacitors in units as indicated.

Thus, the present invention provides an improved time to height converter which has improved high frequency performance by the concomitant use of a discriminator which is insensitive to the various input test signal frequencies thus producing start and stop pulses at precise time intervals along with the range ramp generator and associated circuits which provide for an exact turnoff and turnon of a current source in response to the start and stop pulses. This provides for single shot measurement capability at very short time intervals. In addition, the system is fully programmable by computer to eliminate operator error.

I claim:

1. A time to height converter for providing first and second timing pulses in response to a test signal reaching two predetermined threshold levels and being responsive to the time interval between said timing pulses for generating an output pulse having a height proportional to said time interval comprising, means for providing said two predetermined threshold levels, first and second discriminator means coupled to a source of said test signal each of said discriminator means including semiconductor switching means for comparing said test signal level with a predetermined one of said threshold levels for respectively providing first and second timing pulses when said test signal level reaches said one threshold level; voltage sources of opposite polarity coupled across each of said switching means, said sources including means responsive to a change in said threshold level associated with said switching means for varying the magnitude of such sources to maintain a constant voltage difference between said threshold level and said voltage source magnitudes, and means coupled to said discriminator means and responsive to said timing pulses produced by said discriminator means for generating said output pulse having a height proportional to said time interval between said timing pulses.

2. A time to height converter as in claim 1 in which said semiconductor switching means includes a pair of transistors each transistor having two output terminals, one pair of output terminals being coupled to a positive voltage source and the other pair of output terminals being coupled to a negative voltage source.

3. A time to height converter as in claim 2 together with a pair of bistable tunnel diodes coupled to said transistor pair which switches from one stable condition to the other when the base inputs to said transistors are equal.

4. A time to height converter as in claim 2 together with a resistor coupled to the base input of one of said transistors whose magnitude is adjusted in combination with the absolute magnitude of said voltage sources to compensate for any hysteresis effect in the switching action of said switching means.

5. A time to height converter for providing first and second timing pulses in response to a test signal reaching two predetermined threshold levels and being responsive to the time interval between said timing pulses for generating an output pulse having a height proportional to said time interval comprising, first and second discriminator means coupled to a source of said test signal and responsive to said test signal level reaching said predetermined threshold levels for producing said timing pulses, switching means responsive to said timing pulses for respectively coupling and decoupling a current source to energy storage means, said storage means providing a voltage level proportional to the time interval between said timing pulses, gate means coupling one of said discriminator means and switching means and responsive to one of said timing pulses first in time to provide a step function voltage pulse for closing said switching means and providing said coupling, and stopping means coupled between said other discriminator means and switching means and responsive to one of said timing pulses second in time to provide a stop pulse of opposite polarity to said step function pulse to open said switch said stopping means also being coupled to said gate means to cause a cessation of said step function pulse within the effective time duration of said stop pulse.

6. A time to height converter as in claim 5 in which said stopping means is coupled to said gate means by a delay line providing a delay substantially equal to the effective time duration of said stop pulse.

References Cited

UNITED STATES PATENTS 2,832,044   4/1958   Bliss _____ 132—129 XR

STANLEY T. KRAWCZEWICZ, Primary Examiner

U.S. Cl. X.R.

307—238; 324—68; 328—127, 129